(12) United States Patent
Spaur et al.

(10) Patent No.: US 6,516,192 B1
(45) Date of Patent: *Feb. 4, 2003

(54) COMMUNICATIONS CHANNEL SELECTION

(75) Inventors: Charles W. Spaur, Boulder, CO (US); Patrick J. Kennedy, Boulder, CO (US); Michael F. Braitberg, Boulder, CO (US); Kenneth J. Klingenstein, Longmont, CO (US)

(73) Assignee: Cellport Systems, Inc., Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/588,282

(22) Filed: Jun. 5, 2000

Related U.S. Application Data

(63) Continuation of application No. 08/778,897, filed on Jan. 3, 1997, now Pat. No. 6,122,514.

(51) Int. Cl.$^7$ ................................................ H04B 7/00
(52) U.S. Cl. ........................................ 455/422; 455/507
(58) Field of Search ................................ 455/436, 428, 455/430, 429, 440, 445, 450, 422, 507, 517; 370/433, 466, 467, 468

(56) References Cited

U.S. PATENT DOCUMENTS

| | | | |
|---|---|---|---|
| 4,989,230 A | 1/1991 | Gillig et al. ................. 379/59 |
| 5,189,734 A | 2/1993 | Bailey et al. .............. 455/33.2 |
| 5,203,012 A | 4/1993 | Patsiokas et al. .......... 455/34.1 |
| 5,260,988 A | 11/1993 | Schellinger et al. .......... 379/59 |
| 5,274,837 A | 12/1993 | Childress et al. .............. 455/7 |
| 5,287,541 A | 2/1994 | Davis et al. ............... 455/12.1 |
| 5,301,359 A | 4/1994 | Van Den Heuvel et al. ............ 455/56.1 |
| 5,331,635 A | 7/1994 | Ota ......................... 370/85.13 |
| 5,347,272 A | 9/1994 | Ota ............................ 340/827 |
| 5,408,684 A | 4/1995 | Yunoki et al. ............. 455/34.2 |
| 5,428,636 A | 6/1995 | Meier ......................... 375/202 |
| 5,475,864 A | 12/1995 | Hamabe .................... 455/33.1 |
| 5,475,868 A | 12/1995 | Duque-Anton et al. ....... 455/62 |

(List continued on next page.)

OTHER PUBLICATIONS

Coviello et al., "Conceptual Approaches to Switching in Future Military Networks", pp. 1491–1498, *IEEE Transactions on Communications*, vol. Com–28, No. 9, Sep. 1980.* (Previously Submitted).

*Primary Examiner*—Thanh Cong Le
(74) *Attorney, Agent, or Firm*—Sheridan Ross P.C.

(57) ABSTRACT

A communications system is provided for sending and receiving information relative to a mobile unit in which a number of network channels are available through which the information can be transferred. The system includes a link selector for selecting an acceptable network channel using application requirements for the particular channel, together with channel operating parameter values. When such a channel does not become available, the link selector is also involved with recovery procedures. These network channel operating parameters include bandwidth, information transfer costs and information transfer packet loss, latency and jitter. Weighting vectors are also utilized with such channel operating parameters in determining suitability values associated with the available network channels. The link selector communicates with a link scheduler that has responsibility for determining when information should be transferred including when there should be a change in the timing of the information transfer. The link selector also receives data from a controller/monitor that obtains such dynamic data associated with selected network channel operation in connection with determining whether a switch should be made from the currently selected network channel to different network channel.

9 Claims, 6 Drawing Sheets

U.S. PATENT DOCUMENTS

| | | | |
|---|---|---|---|
| 5,491,690 A | 2/1996 | Alfonsi et al. | 370/60 |
| 5,506,888 A | 4/1996 | Hayes et al. | 379/59 |
| 5,513,379 A | 4/1996 | Benveniste et al. | 455/33.1 |
| 5,519,884 A | 5/1996 | Duque-Anton et al. | 455/33.1 |
| 5,526,404 A | 6/1996 | Wiedeman et al. | 379/60 |
| 5,530,701 A | 6/1996 | Stillman et al. | 370/94.1 |
| 5,544,222 A | 8/1996 | Robinson et al. | 379/58 |
| 5,551,066 A | 8/1996 | Stillman et al. | 455/69 |
| 5,561,836 A | 10/1996 | Sowles et al. | 455/12.1 |
| 5,566,173 A | 10/1996 | Steinbrecher | 370/79 |
| 5,594,718 A | 1/1997 | Weaver, Jr. et al. | 370/331 |
| 5,594,943 A | 1/1997 | Balachandran | 455/33.2 |
| 5,649,308 A | 7/1997 | Andrews | 370/334 |
| 5,826,188 A | 10/1998 | Tayloe et al. | 455/428 |

|  | CHANNEL 1 | CHANNEL 2 |
| --- | --- | --- |
| BANDWIDTH | 28.8 Kbps | 14.4 Kbps |
| JITTER | +/- 100 ms | +/- 300 ms |
| LATENCY | 125 ms | 400 ms |
| COST | 10 cents/Kbyte | 5 cents/Kbyte |
| SECURITY | Level 2 | Level 2 |

FIG. 3

|  | REQUIREMENT | SUITABILITY WEIGHTING |
| --- | --- | --- |
| BANDWIDTH | >= 14.4 Kbps | 0.25 |
| JITTER | < 500 ms | 0 |
| LATENCY | < 450 ms | 0 |
| COST | < 15 cents/Kbyte | 50 |
| SECURITY | >=Level 1 | 0 |

FIG. 4

COMMUNICATIONS CHANNEL SELECTION

This continuation of application Ser. No. 08/778,897 filed Jan. 3, 1997, U.S. Pat. No. 6,122,514.

FIELD OF THE INVENTION

The present invention relates to communicating information including data over one or more selected network channels, particularly where such a communication involves a mobile unit.

BACKGROUND OF THE INVENTION

A number of communication networks are currently utilized in transmitting information including voice and data. Different network channels include CDPD (cellular digital packet data), satellite, SMR (specialized mobile radio), FM-subcarrier, DAB (digital audio broadcast), infrared and two-way messaging. The network channel that is accessed for information transfer depends on its availability in the geographic region of interest.

However, these numerous and quality-diverse communication links available for use in different geographic regions engender a new set of problems that must be faced. Chief among these relates to the reliability of the link or links that might be utilized for a predetermined communications application, particularly where the information transfer involves a mobile unit, whose position changes during the transfer. Unlike communication systems that typify the prior art in which the reliability or stability of a communication link is virtually taken for granted, the present invention involves network channels that, dependin n the conditions, can experience inconsistencies or discontinuities during the particular information transfer.

In connection with addressing these reliability issues, the inventors of the present invention have identified additional parameters as being germane to the process for selecting among different network channels for the transfer of information. These parameters include the bandwidth of the available channel and parameters related to the quality and/or quantity of the information or data being transferred, such as packet loss, packet latency and packet jitter. Bandwidth refers to the information transfer capacity of the channel and is definable in terms of a transfer rate, such as bits/second. Packet loss relates to the number of packets that are lost as a function of the number of packets that are received. Packet latency refers to the typical or average one-direction or end-to-end packet transfer time. Packet jitter refers to the variation in inter-packet receive times. Important additional factors or parameters to be taken into account as part of the network channel selection process relate to the cost of transfer including factors such as the network channel cost per packet and any channel setup cost. In view of these many parameters that can be considered when a channel is selected, the selection process for obtaining a desired or optimum network channel can be a complicated task.

The channel selection process is made more complicated and difficult when the transmitter and/or receiver of the transferred information is part of a mobile unit. In such a case, because of the movement of the mobile unit, such as a vehicle, a presently accessed network channel may no longer be available for use because of the new geographic position of the mobile unit. That is, the presently utilized network channel may not be available in the new location of the mobile unit. The network channel selection process is rendered even more complicated when, due to the different geographic position of the mobile unit, a previously unavailable channel is now available to the mobile unit. This previously unavailable channel may be more desirable for the information transfer that is currently under way.

SUMMARY OF THE INVENTION

In accordance with the present invention, a system is provided for selecting a network channel from among a number of available and acceptable channels. In addition to an initial selection of a network channel when the information transfer is started, the system is able to dynamically adapt to situations where the currently used network channel becomes unavailable or inappropriate and the transfer of information has not yet been completed. Relatedly, the system is able to switch network channels within the course of a particular information transfer or session when it is determined that a more advantageous channel is now available.

The system includes a number of communication units or devices for preparing the information, (e.g., data, a computer program or other software module) for transmission using the selected channel. Such preparation includes making the information compatible with the network that is to carry the information. The compatibility involves establishing the proper network protocol and appending the correct address associated with the network channel over which the information is to be transmitted.

The system further includes a network channel or link selector for automatically and dynamically selecting an appropriate network channel for transmission of information. The link selector communicates with at least one of the communication devices. The link selector conveys the identity of the selected network channel to this communication device so that it can prepare the correct network address that is to receive the information.

With respect to the channel selection process, the link selector obtains information transfer-related requirements for a particular application that is to be performed, e.g., involving the transfer of data. The application performance may involve one or more different uses of the application. These applications requirements are stored in an application requirements database. The application requirements typically include parameters such as bandwidth, destination of information to be transferred, economic factors including cost of transfer and parameters related to the quality of the packet transfer including packet loss, packet latency and packet jitter. The application requirements may also include a security level requirement. The application requirements also include a "weighting vector" for each of the application parameters. The value of the weighting vector might change between or among uses of the particular application. The weighting vector acts as an indicator of the weight to be applied to the particular application parameter, in comparison with the weight that is to be given to the other application parameters. By way of example, a cost requirement may be given ten times the weight of a bandwidth requirement thereby indicating that, for this particular application, the cost of transmission is to be given significantly greater weight in deciding which network channel is to be selected than is the bandwidth parameter.

The link selector also accesses a communications link database that stores network channel parameters. The channel parameters essentially characterize or define the capabilities of the channel. The channel parameters, for each network channel to be analyzed, are checked or analyzed in the context of the particular application requirements, to determine which of the channels are available for possible use. This analysis is typically conducted using dynamically changing channel parameters, as well as static parameters. From the available channels that are found to be acceptable, one or more of them is selected for the particular application. In determining network channels that are deemed acceptable for the current transmission, each of the channel parameters is compared with its corresponding application requirement. If the particular channel parameter cannot satisfy its corresponding application requirement, the network channel under analysis is found to be unacceptable. This acceptability analysis is conducted for each of the available network channels. For each of such channels where one or more particular channel parameters was not able to meet or satisfy the corresponding application requirement, a determination is made that such a channel is not acceptable for the current information transfer. On the other hand, for each network channel that did satisfy all of the application requirements, they have met this stage of evaluation in connection with determining the selected channel. If it occurs that no acceptable channel is available, particularly where there is a time constraint within which the information transfer is expected to take place, recovery procedures are implemented including the ability of the user involved with the particular application to dynamically alter the application requirements in order that a channel can be selected that meets the user's altered application requirements.

For each of these acceptable network channels, the next stage of analysis is conducted. In particular, a suitability value is found using each weighting vector and its associated channel parameter value that has a corresponding application requirement for the current information transfer application. For example, the particular application has a bandwidth requirement. The channel parameter value for bandwidth for a first acceptable network channel is obtained. The weighting vector for bandwidth is also obtained. The weighting vector is mathematically combined or otherwise utilized with the channel parameter value to calculate a suitability sub-value for the bandwidth parameter. These steps are followed for each of the application requirements in connection with the first acceptable network channel. The suitability sub-values obtained are combined or added to obtain a suitability value for this first acceptable network channel. A suitability value is determined for each of the other acceptable network channels that were found to meet the application requirements. Each of these determined suitability values is then compared with each other to select the network channel having the highest or desired suitability value.

In conjunction with the selection of the desired network channel, a key factor relates to the timing of the information transfer and when one or more channels are available for transmission. This factor is especially important in embodiments in which the source of the transmission or the receiver of the transmission is a mobile unit. In order to take into account the timing factor, the system further includes a link scheduler that operatively communicates with the link selector. The link scheduler is involved with a number of functions or operations related to when the particular transfer is to be made. When the particular information transfer is not to be conducted immediately or can be delayed, the link scheduler is useful in determining the identity or identities of network channels that will be available later in time. That is, due to the delay in transfer, the link scheduler is able to determine that one or more network channels will become available during one or more relevant time periods. This time-related information can be used in selecting a desired network channel for subsequent transmission of such delayed information. In that regard, the link scheduler works with the link selector by informing the link selector of the subsequent availability of such network channels. The link selector is then able to determine whether or not such a channel is acceptable and to determine its suitability value in order to compare it with other acceptable network channels. With regard to the determination made by the link scheduler as to the future availability of one or more available network channels, the link scheduler relies on the current geographic position of the transmitter or receiver of the information, whichever or both is applicable. The link scheduler also relies on future geographic position information, which can be found by the link scheduler using movement related data, such as the velocity of the mobile unit that includes the transmitter or receiver. The link scheduler is also responsible for changes in priority of information transmission. When there is a change in the application related to when it is to be sent, the link scheduler receives this update or priority change and notifies the link selector that, for this particular application, it is desired that this information transfer occur now. The link selector can then perform its functions in selecting a network channel for this transfer. Conversely, the link scheduler assists in deleting a scheduled transfer that the user or system decides should not be made. The link scheduler is also involved with alarm conditions. When it receives such a condition related to what information or data should be transmitted immediately, it advises the link selector so that it can regulate the sending of information associated with the alarm condition including the possibility of interrupting the transmitting or receiving associated with a current application. The link scheduler is also involved with checking as to whether or not a currently used network channel will go off-line or not be available to complete a particular transmission. If the link scheduler makes the determination that the currently used network channel will not be available for the complete transmission, it notifies the link selector so that it can prepare for switching to another network channel including one or more network channels that the link scheduler has indicated to the link selector will be available at the appropriate time.

In addition to the link scheduler, the link selector also receives information from a controller/monitor that receives data related to how well the information is being transferred at any instance in time, such as measured signal strength, measured packet loss, measured packet latency, and measured packet jitter. Using this data from the controller/monitor, the link selector might decide that a different network channel should be selected. In addition to data obtained by monitoring, dynamic costrelated data can also be obtained by requesting such information from network channel or carrier providers. These carrier providers can supply cost estimates based on factors such as the extent or volume of the information transfer.

Based on the foregoing summary, a number of salient features of the present invention are readily discerned. A system is disclosed for providing communication capabilities using a number of different available network channels. The system is able to select an acceptable network channel from a number of acceptable channels. The selection process uses previously identified and stored application requirements, weighting vectors and network channel parameters. One or more of these acceptable channels might include the capability of making more bandwidth available for the particular transfer thereby providing a further factor for consideration in deciding which of the acceptable channels should be selected. The timing of the transfer can be controlled to take advantage of a better network channel for transmission. The system allows for dynamic change of the network channel being utilized. A currently used network channel can be switched to another network channel because, for example, a different application with higher priority requires a different network channel. Relatedly, current operation of the selected network channel is monitored. Data from this monitoring is useful in deciding whether dynamic characteristics of the current channel have so changed to warrant the selection of another network channel.

Additional advantages of the present invention will become readily apparent from the following discussion, particularly when taken together with the accompanying.

BRIEF DESCRIPTION OF THE DRAWINGS

FIG. 3 is a chart of representative channel parameter values based on a number of network channels; and FIG. 4 is a chart of channel application requirements and weighting vectors for a representative application.

DETAILED DESCRIPTION

Figure 1:
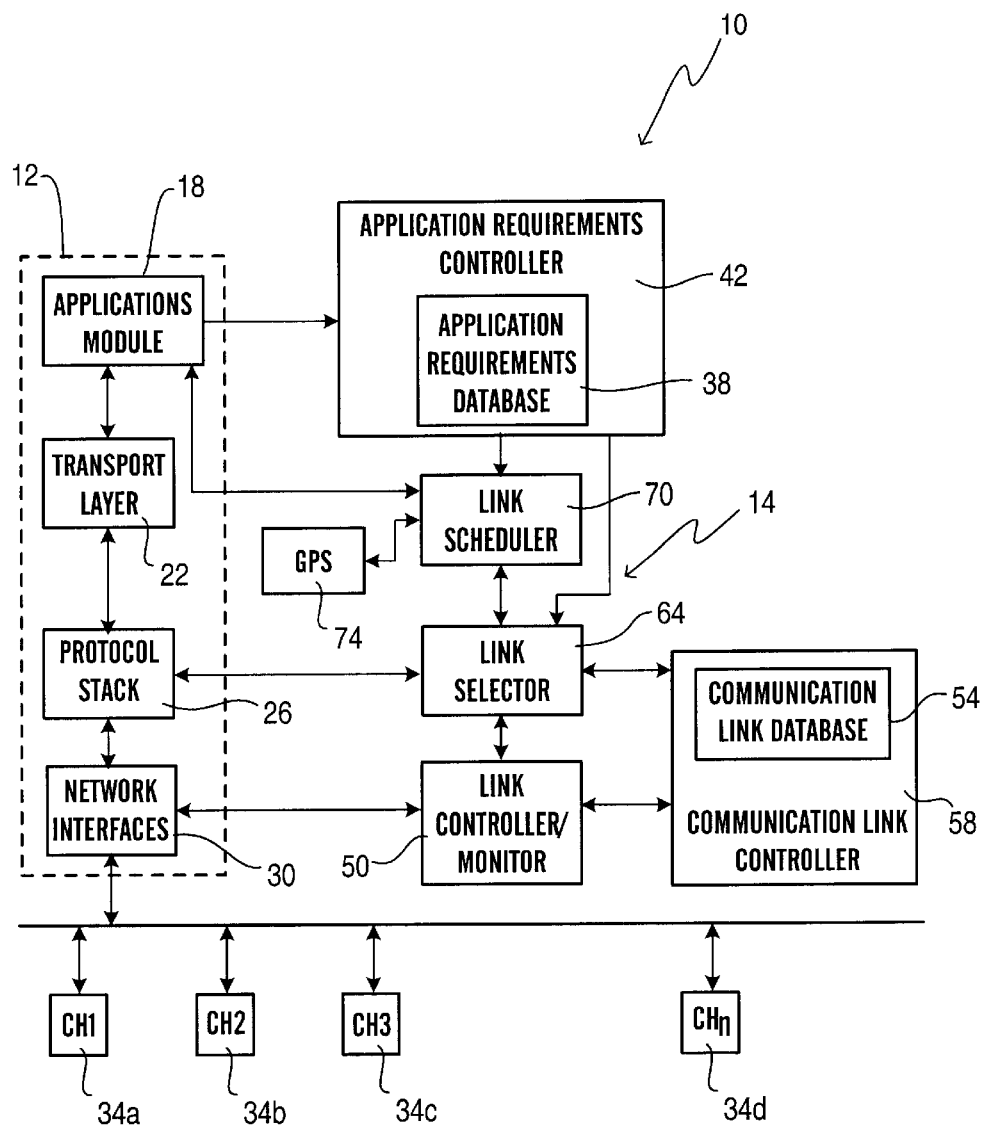
FIG. 1 is a block diagram of the present invention illustrating the relationship among the major sub-systems.

With reference to FIG. 1, a communications system 10 is disclosed for transmitting information including data from/to a mobile unit. The system 10 includes a number of major units or components. In one embodiment, the system 10 is defined as a combination of a terminal stack 12 and a network channel selection apparatus 14. Together the terminal stack 12 and the network channel selection apparatus 14 comprise all of these components. Each of the terminal stack 12 and the network selection apparatus 14 is providable with the mobile unit. The terminal stack 12 is used in preparing the information for transfer or, alternatively, for handling information that is being received. The terminal stack 12 includes a number units or sub-systems. An applications module 18 includes user programs that have communication requirements relative to a site different from the mobile unit. For example, a mobile unit or vehicle may be involved with shipping of goods and needs to report to a base station concerning status of its shipment, such as present location, condition of the goods, vehicle condition, estimated time of arrival and so forth. In such a case, the applications module 18 obtains the appropriate data and executes the program for providing such information. The applications module 18 is able to either dynamically, as the application executes, or statically, at the time of application installation, to transmit certain application requirements to the network channel selection apparatus 14. The application requirements relate to how or the manner by which information is to be transferred for the particular application. As will be noted in greater detail, such application requirements include economic factors and transfer rate parameters, as well as user inputs that can be dynamically generated during use of a particular application and which can affect channel selection.

The applications module 18 communicates its output to a transport layer 22 of the terminal stack 12. The transport layer 22 regulates the transfer of the information over the network channel that is selected using the network channel selection apparatus 14. Transport layer 22 typically utilizes available protocols, such as the transmission control protocol( TCP) and the user datagram protocol(UDP).

A protocol stack or unit 26 isolates the upper units of the terminal stack 12 from the network channels that carry the transmitted information. The protocol stack 26 is responsible for addressing and delivery of data packets through the selected one or ones of network channels. The protocol stack 26 is able to simultaneously utilize a number of network channels and, correspondingly, a number of "network addresses" that relate to the chosen network(s) over which the present information is to be transferred. The protocol stack 26 also communicates with the network channel selection apparatus 14, which directs or controls the identity of the network channel(s) that is (are) to be utilized in connection with the current transfer. In a preferred embodiment, the protocol stack 26 utilizes the Internet protocol.

Information packets transferred relative to the protocol stack 26 are sent and received through network interfaces 30, which interconnect the protocol stack 26 with a selected network channel. The network interfaces 30 enable each network channel in communication therewith to be independently addressed. Each packet of information including data that is output from the protocol stack 26 includes a header with the network address, which is used by the network interfaces 30 to properly direct the particular packet to the designated destination address. Relatedly, information packets are received by the network interfaces 30 from the particular selected channel that is transmitting information to the communications system 10 having this network interfaces 30.

The network interfaces 30 communicate with a number of different network channels or links 34a–34n through which information is transferred relative to the terminal stack 12. These network channels 34a–34n are characterized by different operating parameter values that relate to the transfer of information. By way of example, these network channels 34a–34n include a plurality of the following wireless channels: cellular digital packet data (CDPD) over which digital data is able to be sent; satellite; specialized mobile radio (SMR) such as utilized by law enforcement, shipping or medical personnel; spread spectrum featured channels; FM-subcarrier such as using particular FM frequency bands that are available to a vehicle radio; digital audio broadcast (DAB) that provides a greater number of radio channels that can be adequately heard by a listener in a vehicle, such as by using a satellite link to the vehicle radio; infrared; two-way messaging including paging transmissions; fiber, twisted pair and an industrial medical scientific(IMS) band that transmits certain kinds of information.

In addition to the feature of communicating with channels or links of such different networks, the terminal stack 12, including the network interfaces 30, enables the communications system 10 to transmit and receive information, during one particular bi-directional communications operation, using two different networks and therefore two different network channels or links 34a–34n. For example, it may be desirable for cost reasons to send data from the communications system 10 over a spread spectrum link to a remote station at relatively low cost since the transfer time is essentially not important; however, during this same bi-directional operation, it may be worthwhile to send information from this same remote station to the communications system 10 using a relatively higher cost network channel, such as a CDPD channel because the transfer time is important.

With respect to this multiple channel transfer for the same bi-directional communication, two ways of implementation are described. In one embodiment, the communications system 10 prepares outbound packets as if it is routing from the desired inbound packet interface to the selected outbound packet interface. By way of example, the communications system 10 has network interfaces L1 and L2 of the network interfaces 30. To communicate with a remote station, the communications system 10 has determined that the L1 network interface is a better choice for outgoing packets and the network interface L2 is the better choice for incoming packets. The protocol stack 26 constructs the outgoing packets with the L2 network interface associated address as the source and the network interface L1 has a node that is accessed or used in route to the ultimate destination. The packet is then sent through the L1 network interface. When responding, the remote station routes packets to the communications system 10 along the route it determines optimal to reach the L2 network interface of the communications system 10. Accordingly, in the return path, the network interface L1 is not utilized.

In another embodiment for implementing this feature, the communications system 10 works with a proxy server. The proxy server determines what communication paths and interfaces should be utilized in communicating with the communications system 10. By way of example, the communications system 10 has network interfaces L1 and L2 of the network interfaces 30. Assume that the communications system 10 has determined that the network interface L1 is a better choice for outgoing packets, and the network interface L2 is a better choice for incoming packets. The communications system 10 informs the proxy server of these link selections and then proceeds to route information via the proxy server through the network interface L1 for forwarding on to the destination station. The destination station responds to the proxy server, which then forwards any response to the communications system 10 via the network interface L2 as instructed. This implementation requires the execution of software using the proxy server that is capable of understanding and processing the requests of the communications system 10. The proxy server will run an application that modifies each packet that is forwarded to or from the communications system 10.

With regard to the operating parameters of these different network channels 34a–34n, they include the following:

bandwidth—refers to a magnitude of data or other information that can be sent over a channel during a certain period of time, such as bits/second;

packet loss—relates to the number of packets that are anticipated to be lost, or are actually lost, in relation to the number of packets that are successfully transferred;

packet latency—relates to the average or typical two-way packet travel time;

packet jitter—relates to the anticipated variation in inter-packet receive times;

coverage map—refers to the geographic regions where a network channel is able to transfer information;

security—refers to a level, degree or classification related to the capability of a network channel to prevent unwanted access to it or to avoid jeopardizing the integrity of the information sent over the particular channel;

channel setup cost—refers to the cost of establishing access to a desired channel for a new "session" where a session ends when the communications link between such channel and the destination address for that channel is terminated; and channel cost per packet—refers to the typical or average cost of transferring a byte of information over the particular network channel and is a function of a number of factors including the elapsed time for sending the packet and the destination of the packet.

In view of such numerous parameters associated with each network channel, an analysis thereof is conducted in determining the identity of the network channel 34a–34n that is desirable or optimum for the particular transfer. The network channel selection apparatus 14 is invoked to perform this analysis. In that regard, the user or controller of the information to be transferred must supply the channel selection apparatus 14 with requirements or constraints that must be met by the network channel 34a–34n that is selected. The description of the requirements correspond or relate to previously defined network channel operating parameters including: bandwidth, channel security, packet loss, packet jitter, packet latency, channel costs and destination. Included with the application requirements provided by the user for the particular application are quantitative thresholds or limits correlated with the application requirements. These quantitative values are based on the following considerations:

bandwidth—a profile where information transfer performance degrades as bandwidth decreases, with there typically being a bandwidth threshold which the transfer operation should not go below, but if that occurs the transfer operation should be altered and guidelines can be provided for reserving communication bandwidth as part of that possible alteration of the operation;

packet loss—a magnitude related to tolerable packet retransmit requests;

packet latency—a profile of values related to tolerable round trip packet time;

packet jitter—a profile of values related to variations in inter-packet receive times that can be tolerated;

security requirement—the security level, if any, that should be satisfied for the particular transfer;

costs—one or more values related to costs in connection with accomplishing the particular information transfer;

destination—one or more remote locations that are to receive the information and which are useful in reaching a decision on desired or optimum routing;

quality of service—refers to desired or necessary characteristics or functions sought by a particular information transfer, such as a reasonably certain bandwidth and transfer priority (i.e., the particular information transfer will occur within a predetermined time window and/or before a predetermined time or event), for example, in order to properly transfer video information within a desired time, a threshold bandwidth or transfer rate might have to be satisfied; and channel stability—refers to differences or variance in certain dynamic parameters during channel operation that can be measured, e.g., anticipated transfer error rates and/or signal strengths may vary from the anticipated magnitude for a particular channel and this variance may occur for a number of reasons, such as due to environmental conditions that the mobile unit is currently experiencing and, if this measured delta ($\Delta$) for the channel being used exceeds a threshold, a decision may be made to switch to a different network channel.

Each application requirement, for each particular information transfer, also includes an associated "weighting vector". The weighting vector is mathematically applied to a channel parameter to which it is correlated in conjunction with the network channel selection process, as will be discussed in greater detail later herein. The weighting vector constitutes the "weight" or degree of value or influence that is to be given to that particular application requirement. For example, depending upon the objectives sought to be achieved, greater or lesser weight may be given to transfer costs than that which is given to the bandwidth of the network channel.

The application requirements including quantitative-based magnitudes or values are stored in an application requirements database 38 that is part of an applications requirement controller 42 of the network channel selection apparatus 14. The applications requirement controller 42 provides an interface for managing the database 38 contents and maintaining access control. In that regard, the applications requirements controller 42 communicates with the applications module 18 and is able to receive application requirements that are downloaded to the stack terminal 12 from a remote control site. The application requirements for a particular application can change from one use of the application to another use thereof, which can also be defined as a change in the application itself. By way of example, an application might be a computer program that is executed on a regular or irregular basis to arrive at data that is to be transferred. The application requirements for this particular application relate to how to send data obtained as a result of the execution of this computer program to another site or station. Such application requirements might change so that, after obtaining data from a first execution of the computer program and sending the data by one channel, for the second execution of the computer program, the data is to be sent by another network channel. Significantly, this change in application requirements that affects the transfer of data obtained from the same computer program can be initiated or caused by human intervention or user interactivity that can be received at any time.

The network channel selection apparatus 14 also includes a link controller/monitor 50 that is operatively connected to the network interfaces 30 for receiving information therefrom and making requests thereto. In particular, the link controller/monitor 50 takes responsibility for the control and status of the network channels 34a–34n. It maintains a status watch of each such channel by means of its communication with the network interfaces 30. The monitoring process is network channel dependent. For example, one network channel might have separate or discrete control paths or lines, while another network channel might have data and control paths interleaved. Another embodiment might have channel monitoring as an inherent property so that the link controller/monitor 50 is able to directly obtain or read the desired status. In a further alternative or variation, the link controller/monitor 50 will be involved in the use of a test packet for checking the status of the particular network channel.

The link controller/monitor 50 has access to a communication link database 54 through a communication controller 58. In arriving at the type of channel monitoring that is required, the link controller/monitor 50 obtains the necessary information from the communication link database 54. Based on such information, the link controller/monitor 50 is able to perform the monitoring or invoke an appropriate monitoring subroutine. The results of any such monitoring process are stored in the communication link database 54. This database 54 also contains information or data related to the operating parameters of the network channels 34a–34n. These include, for example, coverage maps, pricing schedules that may be location and time dependent, schedules of availability of network channels, estimated transfer error rates and the type of channel monitoring to be conducted. The network channels 34a–34n also have dynamic characteristics or properties associated therewith. That is, during use or operation of a particular network channel, certain parameters can be checked to determine whether or not each is meeting its expected operating function. For example, retransmit requests per packet (packet loss), round trip packet travel time( packet latency), variation in interpacket travel time( packet jitter) and signal strength are measured. The results of such measurements are maintained in the communication link database 54 using the link controller/monitor 50 that obtains such measured information from the protocol stack 26.

The network channel selection apparatus 14 further includes a link selector 64 that functions as the main controller of the system and includes one or more processing units in connection with the analyzing process for selection of one or more network channels through which information is to be transferred for the current application. With regard to conducting the analysis, the link selector 64 utilizes the application requirements for the particular application, together with the operating parameters for the network channels 34a–34n. After the analysis is completed, the link selector 64 communicates with the protocol stack 26 in order to modify its configuration so that the protocol stack 26 generates the correct network address or addresses for the selected network channel(s).

The link selector 64 also controls a number of link operation modes, such as low power standby mode when the system is not currently being used to transfer information or not being used to analyze what channel should be selected for a particular transfer. When appropriate or necessary, the link selector 64 can also be used to obtain additional bandwidth from a number of network channels in order to provide more bandwidth for a given application. The link selector 64 is further available for dynamically changing the current network channel being utilized for a transfer to a different network channel, based on changing communication and economic conditions.

Figure 2A:
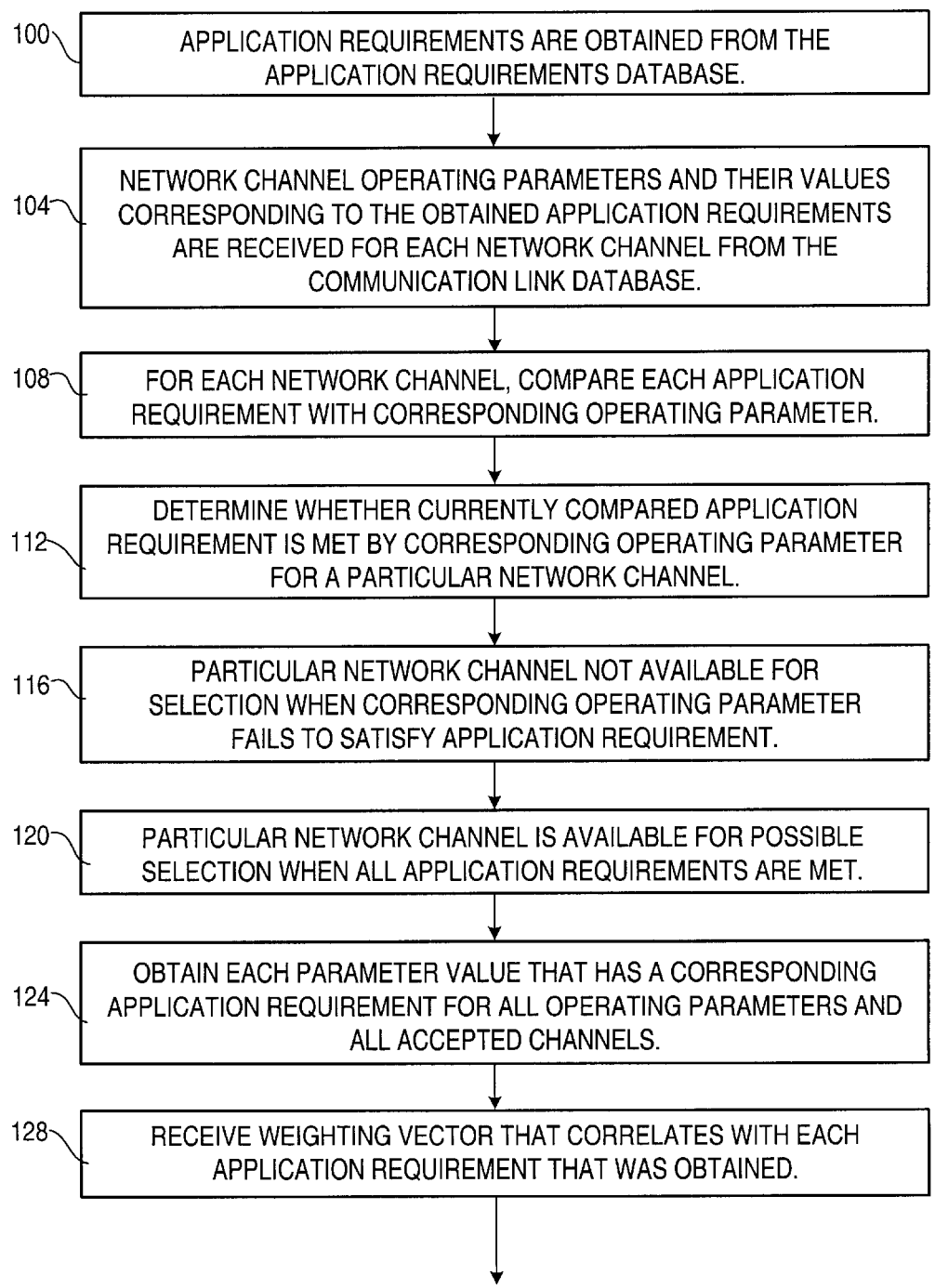
FIGS. 2A–2B together illustrate a flow diagram of major operational steps of the present invention involving the channel selection process.
Figure 2B:
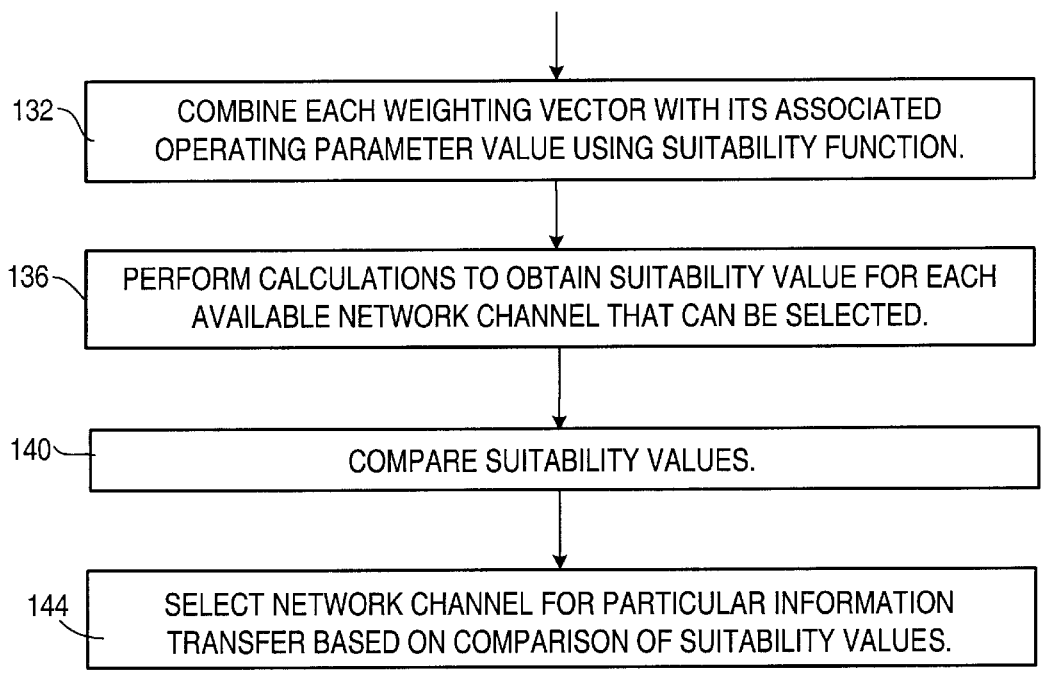

With reference to FIGS. 2–4, additional details of the analysis involving the channel selection process will next be described. FIGS. 2A–2B illustrate a flow diagram of major steps taken in selecting a network channel. The description of this flow diagram will be made in the context of a particular application (defined as application A) that has certain application requirements, as set out in the chart of FIG. 3. In particular, application A requirements include a number of factors with accompanying quantitative values. These factors are bandwidth, security, packet loss, packet latency, packet jitter and cost. The link selector 64 obtains this information from the application requirements database 38 through the application requirements controller 42. For each network channel 34a–34n that is connected or connectable to the network interfaces 30, the link selector 64 obtains operating parameters that correspond to or correlate with the application requirements. Such operating parameters are accessible from the communication link database 54 through the communication link controller 58.

As indicated in FIG. 2A, the application requirements for application A are obtained in accordance with step 100 and the corresponding operating parameters for each network channel 34a–34n are obtained at step 104. The link selector 64 checks or compares each application requirement with the corresponding parameter, for each such network channel, at step 108. A determination is made at step 112 as to whether or not the currently compared application requirement is satisfied by the corresponding parameter for the current network channel under analysis. If not satisfied, the decision is made, at step 116, that this channel is not available for selection. If the application requirement is satisfied, and all other application requirements are met for this particular channel under analysis, then the determination is made that this channel is available for possible selection at step 120. After all network channels 34a–34n have been analyzed in accordance with steps 100–120, all channels that have met all application requirements are deemed to be network channels available for selection.

With reference to FIG. 4 as well, the description will continue regarding the operation of the link selector 64. In furtherance of the example of FIG. 3, and based on the results of conducting steps 100–120, a determination is made that only channels 34a, 34b are available for selection since these are the only two network channels that were found to meet all application requirements for application A. Regarding FIG. 2B, for each network channel that has been determined to be available for selection, each parameter value or magnitude is obtained that has a corresponding application requirement. For example, one of the application requirements for application A is bandwidth. The value for the bandwidth parameter is obtained for network channel 34a which, in this example, is 28.8 Kbps. In accordance with step 124, the foregoing is accomplished for all such parameter values. At step 128, the associated weighting vector for each such requirement for application A is obtained. For example, the associated weighting vector for the bandwidth application requirement is 0.25. Each such weighting vector for application A requirements is obtained from the application requirements database 38. At step 132, each such weighting vector is combined with its associated parameter value using a suitability function. The associated parameter value can be a recently measured value for a dynamically changing parameter, such as packet loss, latency and/or jitter. The suitability function defines the relationship among the parameters for a particular channel and their associated weighting vector. In accordance with the example set out in the chart of FIG. 4, the suitability function S can be defined as follows:

S(channel(n))=weighting vector(bandwidth)×bandwidth value+weighting vector(packet jitter) ×1/packet jitter value+weighting vector(packet latency)×1/packet latency value+weighting vector(cost)×1/cost value.

With respect to the two network channels 34a, 34b that were found to be acceptable for selection and based on the representative example of FIGS. 3 and 4, the suitability values for each of these two channels can be determined as follows:

S(channel 34a)=0.25×28.8+0+0+50×1/10=12.2

S(channel 34b)=0.25×14.4+0+0+50×1/5=13.6 where, in this example, the packet jitter and packet latency, as well as the security parameters for channels 34a, 34b meet the minimum or threshold requirements set by application A. Consequently, they are not considered in the suitability function calculations, i.e., the weightings for these parameters are considered to=0.

Returning to the flow diagram of FIG. 2B, the foregoing calculations using the suitability function are accomplished using step 136. After step 136, step 140 is performed by which each of the suitability values that was determined is compared to each other. In the present example, the suitability values of 12.2 and 13.6 are compared with each other.

After step 140, the selection of a network channel for information transfer is made based on this comparison in step 144. Since the suitability value of 13.6 is greater than the suitability value of 12.2, network channel 34b is selected as the desirable or optimum channel for this transfer, in light of the application A requirements and the parameter values for this channel. In this example, the slower channel 34b is less expensive on a per kilobyte basis but still meets the threshold bandwidth requirement. In view of the given weightings, the slower, less expensive channel 34b is deemed to be more suitable for conducting the information transfer associated with application A.

Applications other than the foregoing example may evaluate the application requirements for each channel parameter and then distinguish among the channels available for selection on a cost basis only. In such a case, the only non-zero weighting vector in the suitability function relates to cost. On the other hand, for interactive applications, packet latency and bandwidth will probably be weighted relatively higher in comparison with cost. For simple telemetry applications where data need not be received immediately, cost will probably have a relatively high weighting, similar to the foregoing example involving application A requirements.

As seen in FIG. 1, the network channel selection apparatus 14 further includes a link scheduler 70 for performing a number of functions related to the selection of a desired network channel, particularly relating to transfer time or when the information transfer should be made. The link scheduler 70 provides the capability of combining current system 10 location, as part of the mobile unit, with geographic coverage maps. That is, the link scheduler 70 is useful in identifying network channels that may become available later due to movement of the mobile unit. This functional capability can also be coupled with information transfer priority, with the link scheduler 70 contributing to the determination as to whether the information should be buffered or transmitted immediately.

The link scheduler 70 also communicates with a global positioning system (GPS) 74 of the selection apparatus 14. The GPS 74 is used to provide the location of the mobile unit having the communications system 10 and the direction of travel thereof. A highly accurate time measurement is also derived. With this GPS-derived location and velocity information, the link scheduler 70 can determine which network channels will be going off-line and schedule a channel switch before loss of communication occurs. The network channel to be switched to is controlled by the applications requirements stored in the application requirements database 38. Such analysis capability enables the link scheduler 70 to be involved in determining whether it is advisable for the information to be transferred immediately or buffered for some time period in order to wait for a more acceptable network channel. The link scheduler 70 also communicates directly with the applications module 18 and thereby provides an interface for the applications module 18 to send signals that raise the priority that is to be given to a particular information transfer. This function is advantageous in situations in which low priority data is being collected and buffered for a period of time and then an alarm condition occurs requiring that the information in the buffer be immediately sent. The applications module 18 may have multiple transfers of differing priorities. These priorities can be changed dynamically by the applications module 18 as a function of which particular application has higher priority relative to other active applications. Preferably, the link scheduler 70 responds to the request for a priority change by sending an acknowledge to the applications module 18 that it has received this request and that the request is being handled, such as fulfilling or presently denying the request.

Figure 5A:
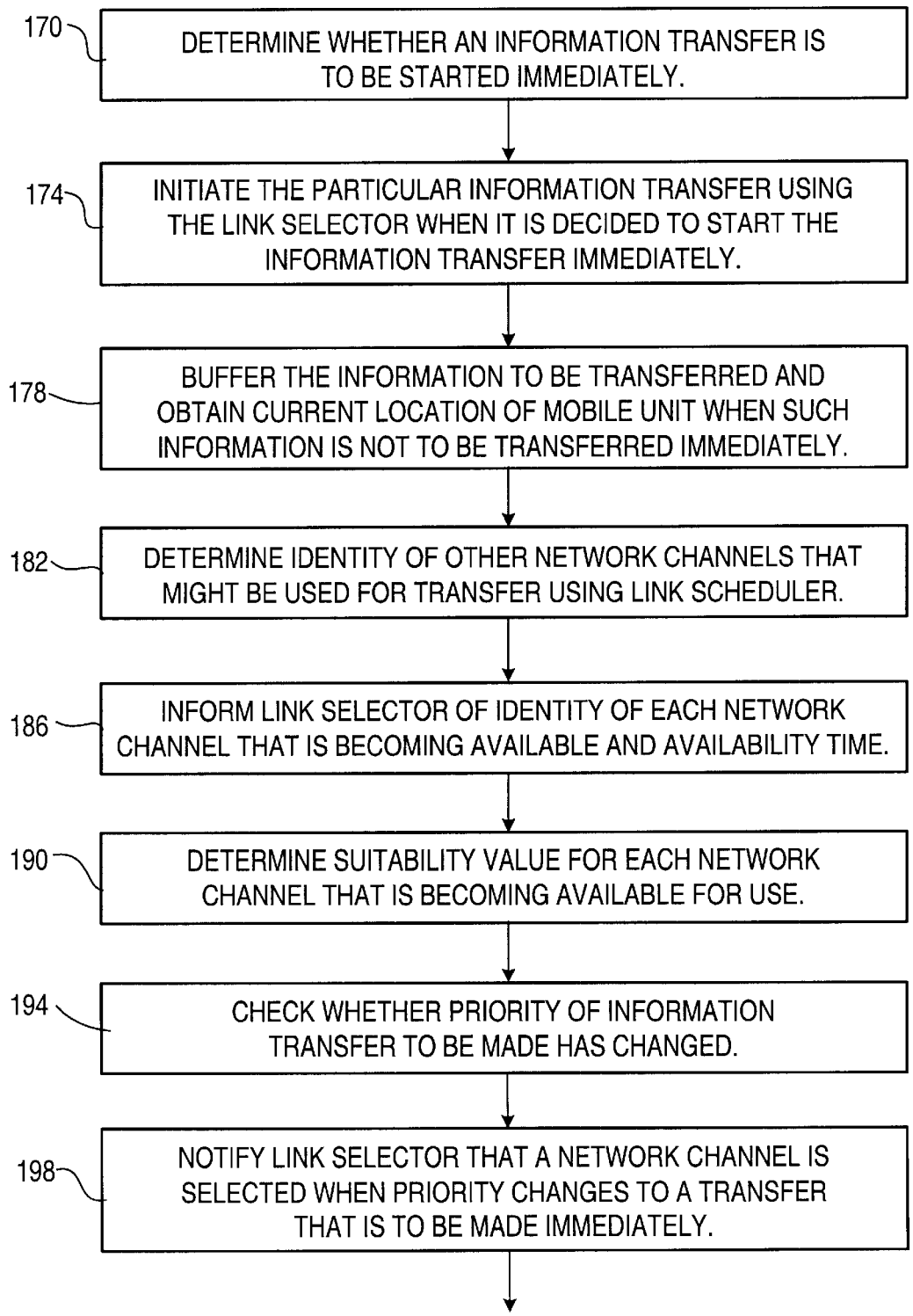
FIGS. 5A–5B together illustrate a flow diagram setting out operational steps involving the link scheduler and its cooperation with the link selector.
Figure 5B:
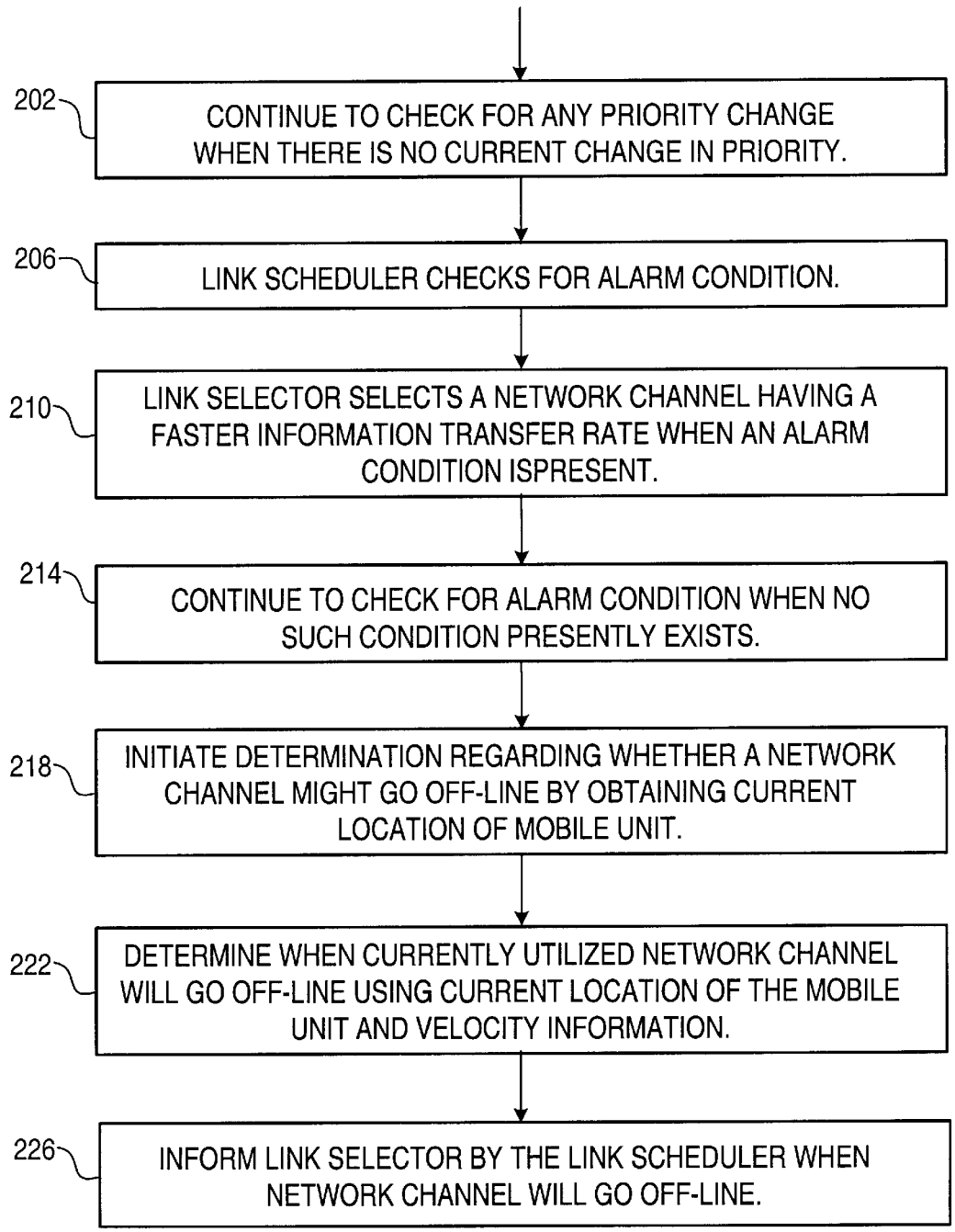

With reference to the flow diagram of FIGS. 5A–5B, a further description of the functions of the link scheduler 70 is provided in a step or operational format. At step 170, a decision is made as to whether or not the particular information transfer is to be started immediately. If this decision is in the affirmative, the link selector 64 takes control to initiate the transfer using one or more selected network channels 34a–34n at step 174. If the decision is in the negative, the information to be transferred is buffered and the link scheduler 70 obtains the current location of the mobile unit having the communications system 10 at step 178. The link scheduler 70 then determines the identity of other network channels that are becoming available for selection, based on current location of the mobile unit and the anticipated change in location of the mobile unit at step 182. The anticipated channels that are becoming available and their availability time is then provided, at step 186, to the link selector 64 for determining each of their suitability values. Each such suitability value is determined for such network channels at step 190 and these values are useful in determining when buffered information should be transferred.

In accordance with step 194, the link scheduler 70 also checks whether or not the priority of a particular information transfer has changed from waiting or delaying to the requirement that such transfer be made immediately. If this inquiry is answered in the affirmative, the link selector 64 is notified or requested that it provide a selected channel using suitability values from application requirements and channel operating parameters at step 198. If, on the other hand, this inquiry is answered in the negative, a check continues to be made regarding whether an information transfer is to be made at step 202 of FIG. 5B.

A further related function involving the link scheduler 70 is noted at step 206 in which a check is made as to whether an emergency or alarm condition is present. When the answer to this inquiry is yes at step 210, the link selector 64 takes control to select a network channel that has an optimum, or at least faster than the current network channel being utilized, information transfer rate. At step 214, when this inquiry is negative, a check continues to be made for any such emergency or alarm condition.

As part of the operational steps involving the link scheduler 70, a determination is made as to whether or not a currently utilized network channel might be unavailable or go off line before completion of the particular information transfer. In accordance with this function, at step 218, the current location of the mobile unit having the communications system 10 is obtained. At step 222, a determination is made as to when the currently utilized network channel will go off line. This determination uses the current location of the mobile unit and the anticipated change in position of the mobile unit using velocity information and/or route or schedule information that the mobile unit follows. With respect to route information, when a mobile unit or vehicle travels a regularly scheduled route, information can be provided related to the current position of the mobile unit based on knowing that it is currently located at a certain station or stop (location node). This information can be combined with location-related information regarding the next location node and the estimated time to travel to it. From this data, the link scheduler 70 can be used in determining that a particular channel will go off line, as well as network channels that will become available. After this determination is made, the link scheduler 70, at step 226, informs the link selector 64 of the date and time when the currently utilized network channel will go off line. The link selector 64 is able to use this information in controlling the switching from the currently used network channel to a new or different selected channel.

The network channel selection apparatus 14 is also configured to handle situations where no acceptable network channel is available and the application requirements for the particular application necessitate that the transfer be made within a certain period of time. In such a case, the information or data has been buffered for transfer under particular application requirements that are to be satisfied within a defined time condition. The link scheduler 70 continues to supply appropriate information, such as a channel becoming available in the future, to the link selector 64 in connection with the determination by the link selector 64 as to whether an acceptable network channel is available. However, when it is determined that the time condition will not be met for the current set of application requirements, the link scheduler 70 informs the link selector 64 of this event and initiates the execution of operational steps termed "error recovery procedures", in accordance with step 230 of FIG. 5B. In particular, the link selector 64 is informed and, depending on previous input provided as part of the application requirements, it takes one or more predetermined steps as part of the error recovery procedure. Such steps include selecting a network channel that previously did not satisfy the application requirements (e.g., cost of transfer too high, bandwidth insufficient or cost is acceptable but reliability of the channel is questionable), compressing information to be transferred in order to meet certain application requirements such as bandwidth and/or not sending at least some of the information that was to be transferred. Relatedly, such provided input can originate dynamically or interactively from the user as the time window decreases or lessens for sending such information.

The foregoing discussion of the invention has been presented for purposes of illustration and description. Further, the description is not to limit the invention to the form disclosed herein. Consequently, variations and modifications commensurate with the above teachings, within the skill and knowledge of the relevant art, are within the scope of the present invention. The embodiments discussed hereinabove are further intended to explain the best mode known of the invention and to enable others skilled in the art to utilize the invention in such, or in other, embodiments and with the various modifications required by their application or uses of the invention. It is intended that the appended claims be construed to include alternative embodiments to the extent permitted by the prior art.

What is claimed is:

1. A method for transferring information relative to a mobile unit using at least one of a number of network channels, comprising:

having information for transfer relative to the mobile unit;

deciding to delay said transfer of said information over said number of network channels; and determining, utilizing a link scheduler, future acceptability for transfer of said information using a priority factor related to a time when said information can be transferred.

2. A method, as claimed in claim 1, wherein:

said deciding step includes ascertaining a value using at least a first application requirement selected from a group that includes bandwidth and cost.

3. A method, as claimed in claim 1, wherein:

said determining step includes determining said future acceptability for said transfer substantially at the same time said deciding step is conducted.

4. A method, as claimed in claim 1, wherein:

said determining step includes checking for a change related to said priority factor by said link scheduler.

5. A method, as claimed in claim 1, wherein:

said determining step includes checking for an emergency condition by said link scheduler.

6. A method, as claimed in claim 1, wherein:

said link scheduler communicates with an applications module having multiple transfers of differing priorities and in which said link scheduler is responsive to said applications module in handling said multiple transfers of different priorities.

7. A method, as claimed in claim 1, wherein:

said link scheduler communicates with an applications module and said determining step includes said link scheduler acknowledging a request from said applications module related to a change in priority as to when said information can be transferred.

8. A method, as claimed in claim 1, wherein:

said deciding step includes not transferring said information over any of said number of network channels.

9. A method, as claimed in claim 1, further including:

controlling transfer of said information including switching to a desired network channel and in which said switching step is conducted free of any request from a network channel different from said desired network channel and all control for said switching to said desired network channel is conducted interiorly of the mobile unit.

* * * * *